Patented Sept. 5, 1939

2,172,314

UNITED STATES PATENT OFFICE 2,172,314

STABLE PARASITICIDE

James F. Adams, Wilmington, and Alexander A. Nikitin, Newark, Del., assignors to Walter C. O'Kane, Durham, N. H., and Paul Moore, Washington, D. C., as trustees for the Crop Protection Institute No Drawing. Application October 28, 1935, Serial No. 47,202

7 Claims. (Cl. 167—16)

This invention relates to insecticides and fungicides, and particularly those utilizing metallic salts as a source of parasiticidal activity, including dusts, solutions, emulsions, sprays, etc.

In the prior art, Bordeaux mixture represents a widely used fungicidal material. Its effectiveness for certain purposes is, however, adversely affected by a number of factors. Its adherence and covering power are limited. It is unstable, and must accordingly be used promptly after manufacture. It is subject to adverse chemical change as by carbonation, oxidation, etc. It causes severe russeting. It has a deleterious effect on vegetable insecticides, such as pyrethrum and derris, and retards or wholly prevents the insecticidal action of such materials. When used in dust form it usually consists of copper sulphate (20%) and hydrated lime 80%). The large proportion of lime and inert vehicle greatly depress the activity of the copper sulphate as a fungicide. Further, Bordeaux mixture offers difficulties in use in combination with oil sprays. For example, in the control of San Jose scale, the addition of Bordeaux to the oil emulsion has been found to reduce the effectiveness of the oil spray. Further, when copper sulphate is used to form Bordeaux mixture at concentrations of two to four pounds in 100 gallons, with many of the oil emulsions for the dormant spraying of peach trees, it precipitates the emulsion. Again, when Bordeaux and oil emulsions are combined, either there is immediate segregation into separate layers, or the copper sulphate-oil emulsion mixture creams very rapidly. Due to the fact that Bordeaux mixture causes a great reduction in the effectiveness of oil in the control of scale, for example, it has proved necessary to spray the oil composition and the Bordeaux mixture separately.

The attempted substitution for lime of other divalent bases like magnesium oxide, strantium oxide, barium oxide, zinc oxide, or their hydroxides for use with copper sulphate and pyrethrum or derris has yielded practically the same deleterious results.

Numerous attempts to use other ordinary salts of sodium, potassium, or lithium as a powder in combinations with copper sulphate for dust and spray applications have not been successful due to the fact that these mixtures chemically are very unstable and/or cake very readily when exposed to atmospheric action. Copper carbonate, cuprous oxide, etc., like Bordeaux, gradually disintegrate into a black cupric oxide, which is practically inert as a fungicide. It is thus well known that the divalent bases cause carbonation, oxidation, etc., and eventually form substantially inert copper compounds (such as copper oxide), which greatly decrease the fungicidal efficiency of copper compounds when used in the form of dusts or sprays.

The unsatisfactory effect of Bordeaux or similar mixtures on the vegetable insecticides like pyrethrum and derris has also led to the use of the latter in sulphur dusts. But such sulphur dusts have limited utility, since they are dependent for effectiveness on the conditions under which used, as, for example, temperature, which must be neither too high nor too low for proper effect of such sulphur dusts, thus giving them a limited seasonal use.

Among the objects of the present invention is the production of parasiticidal compositions containing metal components such as copper salts, which are substantially stable for use in dusts, sprays, emulsions, etc.

Other objects include such compositions which are effectively utilized with vegetable insecticides like pyrethrum and derris, and do not deleteriously affect the latter.

Still further objects include such compositions which are compatible and desirably used in combination with oil sprays.

Still further objects include the stabilization of parasiticidal sprays, dusts, etc. against undesirable change, such as segregation, oxidation, loss of insecticidal activity, etc.

Still further objects and advantages will appear from the more detailed description set forth below, it being understood, however, that this more detailed description is given by way of explanation and illustration only, and not by way of limitation, since various changes may be made therein by those skilled in the art, without departing from the scope and spirit of the present invention.

In accordance with the present invention, zeolites, including alkali metal and alkaline earth metal derivatives, but particularly of the alkali metals are utilized in the production and/or stabilization of parasiticidal compositions in any desired form, such as dusts, sprays, suspensions, emulsions, etc. Such zeolites are particularly used in combination with metallic components as exemplified with the copper compounds. As illustrative of the latter, there may be mentioned desirably soluble copper salts, such as copper sulphate, copper nitrate, copper acetate, copper naphthenate, or other copper salts and compounds. While such salts are preferred, in addition to water soluble copper compounds, others may be used such as the oil soluble copper salts and copper compounds insoluble in both oil and water such as copper carbonate and copper hydroxide. While such compositions may depend on the use of various metallic components, such as the derivatives of zinc, mercury, etc., the copper compounds are utilized particularly as illustrative of the present invention in view of their wide distribution and use in insecticidal and fungicidal compositions.

Illustrating the production of dusts or dusting compositions, sodium zeolite may be admixed with copper sulphate in various proportions. For example, the sodium zeolite and copper sulphate may be in equal parts, or 10 parts of sodium zeolite with 5 parts of copper sulphate may be utilized, or the copper sulphate may be used in considerably smaller proportions, as for example, 10 of sodium zeolite to 4 of copper sulphate, 10 of sodium zeolite to 3.3 of copper sulphate, 75 parts of sodium zeolite to 25 parts of copper sulphate, etc. The proportions may vary widely if desired, since lesser proportions of copper sulphate in the compositions give satisfactory parasiticidal results. Such resulting mixtures are stable, remain as pulverulent materials and show no signs of caking over long periods of time, do not discolor or blacken, and are eminently suited for dusting operations, either in and of themselves, or in combination with added ingredients. Thus mixtures of sodium zeolite, copper sulphate and pyrethrum may be made in the weight ratios of 45:25:30, or of derris in the ratios of 40 of sodium zeolite to 40 of copper sulphate and 20 of derris. These dusting compositions are usually extended by the use of an inert extending agent, such as clay, infusorial earth, bentonite, etc. While sodium zeolite and copper sulphate are particularly emphasized above in such combinations, other copper salts, copper carbonate and copper hydroxide, particularly the soluble derivatives may be employed as illustrated above, and instead of sodium zeolite, other zeolites, particularly of the alkali metals and alkaline earth metals may be employed. The alkali metal zeolites are preferred in those combinations which contain vegetable insecticides, such as pyrethrum and derris. Such dusts have been utilized in the treatment of various plants, etc., and have given excellent control against parasites, as for example on beans, apples and pears. Very good control of anthracnose of vegetable crops and Mexican bean beetle have thus been obtained. In no instance was any injury to plants detected.

The following comparative utilization of sodium zeolite—copper sulphate mixtures, as compared with other combinations for dusting on beans to control Mexican bean beetle were made. Thus in a combination containing 10 parts of sodium zeolite, 10 parts copper sulphate, 10 parts pyrethrum, and 70 parts clay there was approximately 85 to 90% control of beetle with no copper injury to foliage. Similarly with a composition containing 10 parts sodium zeolite, 10 parts copper sulphate, 7 parts derris, and 75 parts clay, there was more than 90% control of beetle with no copper injury to foliage. On the other hand, a commercial copper sulphate-lime-magnesium arsenate combination used in similar tests under identical conditions showed only 50 to 55% control of beetle, while some arsenical injury was observed. And with a commercial sulphur-pyrethrum dust available on the market, there was indicated a 70–75% control of beetle but no injury to foliage. These results were obtained at the same time that a check was run which showed that there was severe injury due to heavy infestation of the bean beetle on the plants under consideration in tests.

In utilizing such materials as dusts, they are desirably reduced to a very fine powder, and it is exactly in such form that the compositions and dusts produced in accordance with the present invention demonstrate their great utility, since they are stable, do not cake, and do not decompose or disintegrate with the formation of darkened products indicating the presence of copper oxide. The results given above show conclusively that the sodium zeolite-copper sulphate mixtures are suitable for dusting purposes, both in and of themselves, and together with vegetable insecticides such as pyrethrum and derris. These same results show that the copper sulphate-sodium zeolite mixtures when used with either of these insecticides give much better control of the Mexican bean beetle, for example, than when sulphur dust is used with derris or pyrethrum. These results show further that much better control was obtained in the case of Mexican bean beetle with the sodium zeolite-copper sulphate dusts containing pyrethrum or derris than with magnesium, calcium and lead arsenate. The problem of arsenical residue on beans is becoming more important, and the demand for vegetable insecticides such as pyrethrum and derris is growing rapidly. The present invention meets such demand, while avoiding injury to fruit or to foliage noted when arsenical compounds are employed. Observation of the dusts on the foliage shows that there was no detectable injury on the bean foliage when the copper sulphate-sodium zeolite dusts were used. Microscopic studies show that the sodium zeolite-copper sulphate mixtures or dusts remained in a very fine state, and that there was no caking detectable after a long exposure to air, as contrasted with the copper sulphate-lime dust, which caked shortly after being dusted, and gradually disintegrated into cupric oxide. The copper sulphate employed in the mixtures referred to above was $CuCO_4.5H_2O$, but other copper sulphates may be employed, such as $CuSO_4.1H_2O$, or the anhydrous material.

Further it has been found that the sodium zeolite-copper sulphate mixtures act much more effectively as fungicides per unit of copper used than do the copper sulphate-lime mixtures. Such sodium zeolite-copper sulphate combinations may be utilized together with other insecticidal and fungicidal components, of which the vegetable insecticides, such as pyrethrum and derris have been illustrated above, and reference may also be made to the inclusion of arsenical compounds, such as calcium, magnesium and lead arsenate, fluorides, etc., such combinations showing a greater adherence and covering power than similar mixtures of sulphur or copper sulphate-lime compositions.

The compositions of the present invention may desirably be employed as parasiticides, as for example, in the disinfecting of seeds. A sodium zeolite-copper sulphate mixture in the proportion of 1:1 may be used for killing parasites on seeds, from ¼ to 1% of the weight of the seeds is sufficient. In the disinfecting of wheat, 100 pounds of the seeds may be intimately mixed from 3 to 6 ounces of the powder or mixture described immediately above. Probably in the use of such sodium zeolite-copper sulphate mixtures in the dusting of seeds, there is slow and gradual action due to the moisture present with the formation of a dilute solution, which acts as a fungicide or parasiticide. Similarly when the sodium zeolite-copper sulphate mixtures are employed as dusts, they are slowly and gradually acted upon by the moisture and other substances present on the foliage exhibiting their desirable properties as a result of such peptizing action.

Undoubtedly the stability of the zeolitic compounds is a factor which maintains the uniformity of the toxicity of copper fungicides in such combinations, and causes much less injury to fruit and foliage than other copper compounds, such as Bordeaux, Oxo-Bordeaux, red cuprous oxide, copper carbonate, etc. Thus the divalent bases (copper, calcium, etc.) present in the base exchange position of zeolytic compounds are much more stable against chemical changes, than when the same bases are present in the form of ordinary simple salts. For example, when copper is in the form of the combinations set forth herein, it is considerably more resistant to change than when copper is present in the form of carbonates, or the other materials suggested in the prior art. One of the important properties of the zeolites of the divalent bases is the protection which is rendered to the base against changes, such as solubility, carbonation, oxidation, etc. The combinations of the present invention also show excellent adherence to foliage as contrasted with the copper lime mixtures of the prior art. This difference in adherence may be explained by the fact that the calcium hydroxide in the prior art combinations is changed to carbonate when insufficient moisture is present, with the result that a good adhering film is not formed, whereas no such deterioration due to carbonate formation is experienced in connection with the compositions of the present invention.

In such utilization of mixtures, for example, of sodium zeolite and copper sulphate, since the mixture is heterogeneous, the proportions of the individual components may be varied to suit particular conditions, plants, etc. Absolute control over the desired characteristics, parasiticidal activity, etc. of the composition is readily obtained, which could not be done if an individual chemical compound were being utilized. The properties of the sodium zeolite-copper sulphate mixture may thus be adjusted to produce the desired concentration of copper ion. This is particularly true in connection with spraying compositions referred to below. The use of the alkali in the form of zeolytic compounds enables such bases as sodium, potassium or lithium, to be utilized in very stable form, so that control of the physical and chemical properties of the resulting copper compounds formed on the plants may be maintained. This control of the components enables regulation of the concentration of electrlytes of the alkali and copper sulphates to be maintained, to modify the speed and extent of the chemical reactions between the copper sulphate and the alkali. Further the sodium zeolite acts as a catalyst or contact agent, which can be used to modify the fungicidal efficiency, as well as the physical and chemical properties of the resulting copper compound.

Where desired, the dust referred to above may be prepared to include protective colloids, such as "Gulac" (lignin pitch), caseinates, glue, gelatin, and other dispersing agents. The incorporation of such protective colloids may be made into the dust or dusting compositions set forth above, or may be utilized in the sprays, solutions, etc. referred to below.

Not only may the zeolite-metal combinations be utilized as dusts, etc. as set forth above, but they may desirably be employed in the form of dispersions, emulsions, sprays, etc. Suspensions, for example, of the sodium zeolite-copper sulphate combination in water, enable the active toxicity of the copper ions to be controlled, and such suspensions and dispersions are stable, showing no blackening or other undesirable change. Thus a suspension of 1.5 to 6 pounds per 50 gallons of water of the 3:2 sodium zeolite-copper sulphate mixture can be effectively used in the spraying of apple trees, or lesser amounts of the sodium zeolite-copper sulphate mixture can be employed.

As pointed out above, the fact that a heterogeneous combination as, for example, of sodium zeolite and copper sulphate is being employed, enables control of the copper ions present in the composition to be adjusted for different purposes. For instance, the peach tree requires a very low concentration of the copper ion, whereas in the case of potato plants, the concentration of the copper ion may be increased to a very high level. Ready adjustment of the desired concentrations may be produced in accordance with the present invention.

The effectiveness of the zeolite combinations may be illustrated in another way. When hard water is used for spraying purposes, a certain amount of the spray material is inactivated as the result of the magnesium and calcium ions which may be present in hard water. This is especially true when summer oil sprays are used in the form of emulsions. It is known that the presence of divalent and trivalent ions, such as calcium and iron, may greatly affect the stability of emulsions, or it may entirely precipitate oil emulsions. The soluble soaps of organic acids which are present in the summer oil emulsions, interact by double decomposition with the salts of calcium, magnesium and iron, giving insoluble salts of the organic acids. This phenomenon quickly increases the surface tension and breaks down the emulsion. The presence of sodium zeolite, however, counteracts the destabilizing effect of the polyvalent ions by converting the ions of calcium, magnesium and iron into an insoluble form of zeolytic compound. Thus the addition of sodium zeolite to the hard water is advantageous in connection with spray materials, such as copper, mercury, zinc, arsenate, and others, which would otherwise be partly inactivated by the presence of divalent and trivalent ions in the spray water. Or the presence of the zeolytic compound in the spray material itself, whether in solution or oil emulsion, etc. will effect a desirable result in this connection.

The compatability of the zeolite copper combinations with oils or oil emulsions and their ready miscibility with the summer oils and oil emulsions employed, makes them particularly valuable for use with oil emulsion sprays. Various kinds of summer and white oils are extensively used for the control of common insects, such as San Jose scale, scurfy scale, terrapin scale, red mite, clover mite, fruit-tree leaf roller, pear psylla, apple aphids, and others. These oils are usually of hydrocarbon type. As pointed out above, Bordeaux mixture cannot always desirably be employed with such oils in the form of sprays or emulsions, due to the separation of the oil from the emulsion, creaming, etc.

On the other hand, the combinations of the present invention, such as copper sulphate-sodium zeolite mixtures may desirably be employed with the oils, oil sprays, emulsions, etc. since they do not deleteriously affect the oil sprays, or their action, the addition of the sodium zeolite-copper sulphate to the summer oils and oil emulsions not affecting the physical or insecticidal properties of the oil emulsions undesirably in contrast to that when Bordeaux mixtures are employed. As a result, combination sprays containing the copper fungicidal or insecticidal components, together with the oils may be carried out in a single spraying operation. The zeolite copper combinations may thus be added to any desired oil, oil spray, or oil emulsion employed for insecticidal purposes. As explained above, the action of the zeolite present in such combinations is particularly desirable where hard water is employed in connection with such oil sprays to avoid the undesirable effects of such hard water on the oil emulsions. For example from 0.5 to 4.0 pounds of the sodium zeolite-copper sulphate combination per 50 gallons of oil emulsion, may be utilized.

Where the copper compounds employed are oil soluble, as exemplified by the copper naphthenate, the zeolites may desirably be employed with such copper naphthenate or other oil-soluble copper compounds in the production of such oil sprays.

Copper sulphate-sodium zeolite combinations in fungicidal concentrations may be added to diluted miscible or emulsions of oil with actual three per cent oil content for applications to trees in dormancy. The above fungicidal combination may also be added to diluted summer oil emulsions of ¼ to ½% concentration to affect a combined fungicidal and insecticidal spray for application to trees in foliage condition.

Since the zeolites, such as sodium zeolite, may be prepared over a wide range of pH values, the acidity or alkalinity of the composition may desirably be controlled for particular purposes in this way. The desirable effects thus secured are exemplified not alone in the matters given above, but the zeolites may thus desirably be utilized in insecticidal compositions containing the vegetable insecticides, such as pyrethrum and derris, whether or not metallic components are present, in order to stabilize such combinations, and to prevent the deterioration of the vegetable insecticides.

If desired, the divalent insolubilizing bases, such as lime, etc. may be added to the zeolite-copper combination, in order to insolubilize some of the components present. But this is not essential, and in the preferred form the divalent bases are not employed.

Because of the valuable properties of the zeolites in such combinations, sodium zeolite, for example, may desirably be added to the usual Bordeaux mixture or copper-lime dust to produce a novel combination for both spraying or dusting use.

Having thus set forth our invention, we claim:

1. A dusting composition comprising a copper fungicidal compound and a zeolite from the group consisting of alkali and alkaline earth metal zeolites, said zeolite acting to stabilize the dust and prevent caking thereof.

2. A dusting composition comprising a copper fungicidal compound, a zeolite from the group consisting of alkali and alkaline earth metal zeolites and an insecticide from the group consisting of pyrethrum and derris, said zeolite acting to stabilize the dust and prevent caking thereof.

3. A dusting composition comprising a copper fungicidal compound and sodium zeolite, said zeolite acting to stabilize the dust and prevent caking thereof.

4. A dusting composition comprising copper sulphate and sodium zeolite, the said zeolite acting to stabilize the dust and prevent caking thereof.

5. A dusting composition comprising sodium zeolite and a Bordeaux mixture, the said zeolite acting to stabilize the dust and prevent caking thereof.

6. A composition containing an insecticidal oil emulsion, a zeolite from the group consisting of alkali metal and alkaline earth metal zeolites, and a copper fungicidal compound, said zeolite functioning to prevent creaming or breaking of the emulsion in the presence of the copper compound.

7. A composition containing an insecticidal oil emulsion, sodium zeolite, and copper sulphate, said zeolite functioning to prevent creaming or breaking of the emulsion in the presence of the copper compound.

JAMES F. ADAMS.
ALEXANDER A. NIKITIN.

CERTIFICATE OF CORRECTION.

Patent No. 2,172,314.

September 5, 1939.

JAMES F. ADAMS, ET AL.

It is hereby certified that error appears in the printed specification of the above numbered patent requiring correction as follows: Page 1, first column, line 18, before "80%" insert a parenthesis; line 41, for "strantium" read strontium; page 2, first column, line 57, for the word "utilization" read utilizations; and second column, line 47, for "$CuCO_4.5H_2O$" read $CuSO_4.5H_2O$; line 72, after "mixed" insert with; page 3, first column, line 61-62, for "electrlytes" read electrolytes; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.